US012691415B2

(12) United States Patent
Lee et al.

(10) Patent No.: US 12,691,415 B2
(45) Date of Patent: Jul. 28, 2026

(54) HOLLOW FIBER MEMBRANE AND METHOD FOR PRODUCING SAME

(71) Applicant: KOLON INDUSTRIES, INC., Seoul (KR)

(72) Inventors: Ji Yoon Lee, Seoul (KR); Young Seok Oh, Seoul (KR); Ah Reum Lee, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 461 days.

(21) Appl. No.: 18/254,840

(22) PCT Filed: Dec. 7, 2021

(86) PCT No.: PCT/KR2021/018438
§ 371 (c)(1),
(2) Date: May 26, 2023

(87) PCT Pub. No.: WO2022/145781
PCT Pub. Date: Jul. 7, 2022

(65) Prior Publication Data
US 2024/0001303 A1    Jan. 4, 2024

(30) Foreign Application Priority Data

Dec. 31, 2020    (KR) ........................ 10-2020-0189895

(51) Int. Cl.
  *B01D 53/22*      (2006.01)
  *B01D 63/02*      (2006.01)
  (Continued)

(52) U.S. Cl.
  CPC ......... *B01D 63/031* (2022.08); *B01D 63/021* (2013.01); *B01D 69/087* (2013.01);
  (Continued)

(58) Field of Classification Search
  CPC .............. B01D 63/031; B01D 69/1216; B01D 63/021; B01D 69/087; B01D 69/10;
  (Continued)

(56) References Cited

U.S. PATENT DOCUMENTS

| | | | | |
|---|---|---|---|---|
| 8,496,122 B2 * | 7/2013 | Gohl | ...................... | B01D 69/02 |
| | | | | 210/500.39 |
| 2006/0144782 A1 * | 7/2006 | Buck | ........................ | D01D 5/24 |
| | | | | 210/500.36 |

(Continued)

FOREIGN PATENT DOCUMENTS

| | | |
|---|---|---|
| CN | 101500696 A | 8/2009 |
| CN | 104519985 A | 4/2015 |

(Continued)

OTHER PUBLICATIONS

Machine translation of KR2006-0022866 Lee (Year: 2006).*

(Continued)

*Primary Examiner* — Anthony Shumate
(74) *Attorney, Agent, or Firm* — Harvest IP Law, LLP

(57)    ABSTRACT

The present invention relates to a hollow fiber membrane including, sequentially from the center: a first layer having a high-density sponge structure including pores with a size of 1 nm or less; a second layer including a finger-shaped structure; and a third layer having a low-density sponge structure including pores with a size of 10 to 1,000 μm, and to a method for producing the hollow fiber membrane.

8 Claims, 1 Drawing Sheet

(51) Int. Cl.

| | | |
|---|---|---|
| *B01D 69/08* | (2006.01) | |
| *B01D 69/10* | (2006.01) | |
| *B01D 69/12* | (2006.01) | |
| *H01M 8/04119* | (2016.01) | |

(52) U.S. Cl.
CPC ......... *B01D 69/10* (2013.01); *B01D 69/1216* (2022.08); *H01M 8/04149* (2013.01); *B01D 2323/22* (2013.01); *B01D 2323/39* (2013.01); *B01D 2325/025* (2013.01); *B01D 2325/026* (2013.01); *B01D 2325/02831* (2022.08); *B01D 2325/04* (2013.01); *B01D 2325/20* (2013.01); *B01D 2325/24* (2013.01)

(58) Field of Classification Search
CPC ...... B01D 2325/02831; B01D 2323/22; B01D 2323/39; B01D 2325/025; B01D 2325/026; B01D 2325/04; B01D 2325/20; H01M 8/04149
See application file for complete search history.

(56) References Cited

U.S. PATENT DOCUMENTS

| | | | | |
|---|---|---|---|---|
| 2010/0294714 | A1 | 11/2010 | Buck | |
| 2012/0305487 | A1* | 12/2012 | Beck | B01D 69/02 |
| | | | | 210/500.27 |
| 2015/0020685 | A1* | 1/2015 | Bhandari | B01D 71/701 |
| | | | | 264/171.27 |
| 2015/0110887 | A1* | 4/2015 | Storr | B01D 61/243 |
| | | | | 521/134 |
| 2016/0310907 | A1* | 10/2016 | Hanakawa | B01J 20/3293 |
| 2017/0001152 | A1* | 1/2017 | Park | B01D 61/025 |
| 2017/0165615 | A1* | 6/2017 | Hornung | B01D 61/243 |
| 2017/0165616 | A1* | 6/2017 | Boschetti-De-Fierro | |
| | | | | B01D 61/243 |
| 2018/0043315 | A1* | 2/2018 | Alexiou | B01D 69/02 |
| 2020/0261861 | A1* | 8/2020 | Zheng | B01D 67/00791 |
| 2021/0379534 | A1* | 12/2021 | Nakao | D01F 1/08 |
| 2023/0182085 | A1* | 6/2023 | Akama | B01D 71/36 |
| | | | | 210/500.27 |

FOREIGN PATENT DOCUMENTS

| | | | |
|---|---|---|---|
| CN | 105032200 A | 11/2015 | |
| JP | S59-228016 A | 12/1984 | |
| JP | S60-246812 A | 12/1985 | |
| JP | 2007181813 A | 7/2007 | |
| JP | 2009-226397 A | 10/2009 | |
| JP | 2014012273 A | 1/2014 | |
| JP | 2014079687 A | 5/2014 | |
| JP | 2017213515 A | 12/2017 | |
| KR | 10-2006-0022866 A | 3/2006 | |
| KR | 2006-0022866 A | 3/2006 | |
| KR | 10-2012-0001970 A | 1/2012 | |
| KR | 2012-0001970 A | 1/2012 | |
| KR | 10-1381080 B1 | 3/2014 | |
| KR | 10-2014-0074752 A | 6/2014 | |
| KR | 10-2015-0001513 A | 1/2015 | |
| KR | 10-2016-0052182 A | 5/2016 | |
| KR | 10-2016-008037 A | 7/2016 | |
| WO | 03/106545 A1 | 12/2003 | |
| WO | 2014/208592 A1 | 12/2014 | |

OTHER PUBLICATIONS

CN office Action dated Jul. 29, 2025.

Jang Hanna et al: "Preparation of dual-layer acetylated methyl cellulose hollow fiber membranes via co-extrusion using thermally induced phase separation and non-solvent induced phase separation methods", Journal of Applied Polymer Science, vol. 32, No. 43, Nov. 15, 2015, XP093202755.

Xia Qian-Cheng et al: "Structure design and applications of dual-layer polymeric membranes", Journal of Membrane Science, Elsevier BV, NL.vol. 562, May 25, 2018, pp. 85-111, XP085403910.

Li D et al : "Morphological aspects and structure control of dual-layer asymmetric hollow fiber membranes formed by a simultaneous co-extrusion approach" Journal of Membranes Science, Elsevier BV, NL, vol. 243, No. 1-2, Nov. 1, 2004, pp. 155-175, XP004572532.

European Search Report dated Sep. 20, 2024.

JP Office Action Dated Feb. 2024.

JP Office Action Dated 24, 2024.

* cited by examiner

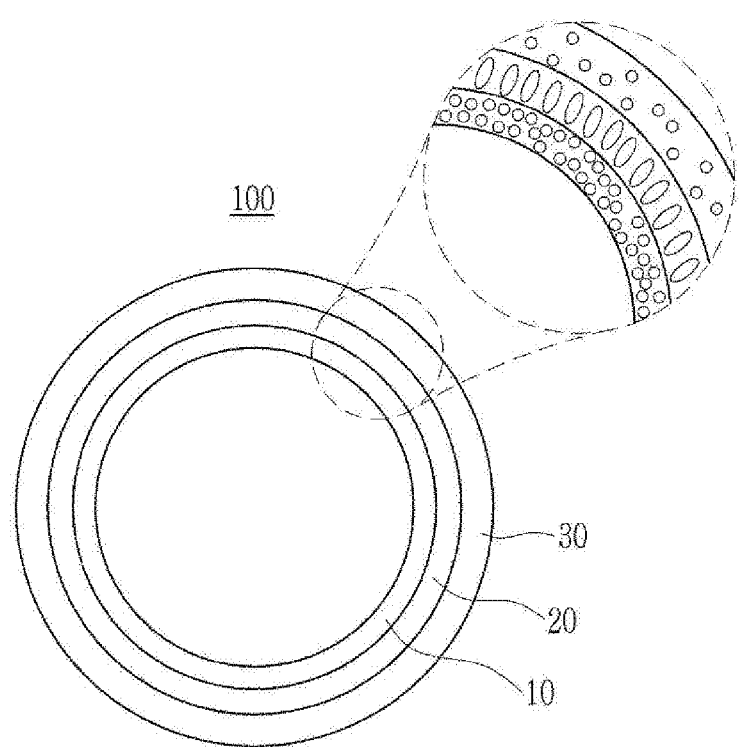

HOLLOW FIBER MEMBRANE AND METHOD FOR PRODUCING SAME

CROSS REFERENCE TO RELATED APPLICATION(S)

This application is a National Stage of International Application No. PCT/KR2021/018438 filed on Dec. 7, 2021, claiming priority to Korean Patent Application No. 10-2020-0189895 filed on Dec. 31, 2020, the disclosures of which is incorporated herein by reference in its entirety.

TECHNICAL FIELD

The present invention relates to a hollow fiber membrane and a method for producing the hollow fiber membrane, and more specifically, the invention relates to a hollow fiber membrane that is preferably used for a humidifying device of a fuel cell system, and a method for producing the hollow fiber membrane.

BACKGROUND ART

In recent years, attention has been paid to methods of conducting humidification and dehumidification by using water vapor permeable membranes. Humidification and dehumidification methods using water vapor permeable membranes have advantages such as that maintenance is not necessary and separate power supply for driving is not required.

A hollow fiber membrane, which is a water vapor permeable membrane having a hollow form, is used for diaphragm humidification of a fuel cell stack and the like. In the case of a fuel cell, humidification with a large air flow rate of about 4,000 NL/min is required for vehicle installation. For this reason, a hollow fiber membrane for humidification is required to have high water vapor permeability and high hollow fiber membrane strength. A hollow fiber membrane for humidification is required to have gas barrier properties for preventing leakage of air from hollow fibers and should also have water vapor permeability. For this reason, when a membrane of hollow fibers is produced into a porous membrane having pores with very fine diameters, and this porous membrane is pressurized, a desired amount of water vapor permeation can be obtained. Furthermore, the air flow rate varies significantly depending on the place of operation or method of operation. For example, a low flow rate may be sufficient when driving in an urban area; however, a high flow rate is required when driving on a mountain road or upon rapid acceleration.

Membranes produced using various kinds of polymers have been proposed as the hollow fiber membrane for humidification. For instance, there is a hollow fiber membrane for humidification produced using a material based on a polyimide resin. A feature of this membrane is that the membrane is excellent in terms of heat resistance, durability, and gas barrier properties. On the other hand, the membrane has a drawback that the water vapor permeability is low.

Furthermore, a hollow fiber membrane for humidification produced using a fluorine-based ion exchange membrane has higher water vapor permeability and gas barrier properties than a hollow fiber membrane for humidification produced using a material based on a polyimide resin. On the other hand, a hollow fiber membrane produced using a fluorine-based ion exchange membrane does not have water vapor permeability to the extent that is actually used as a hollow fiber membrane for humidification, and has insufficient heat resistance, while the price of the hollow fiber membrane itself is very high.

Regarding the method for membrane production, a hollow fiber membrane is produced by using a Non-solvent Induced Phase Separation (NIPS) method or a Thermally Induced Phase Separation (TIPS) method.

According to the non-solvent induced phase separation method, a membrane is produced by discharging a spinning solution in which a polymer resin is dissolved in a good solvent through a spinneret, bringing the discharged spinning solution into contact with a liquid including a non-solvent, and thereby inducing solidification of the spinning solution.

According to the thermally induced phase separation method, a membrane is produced by forcedly dissolving a polymer resin in a poor solvent at a temperature equal to or higher than the phase separation temperature to produce a spinning solution, discharging this spinning solution through a spinneret, and bringing the discharged spinning solution into contact with a coolant liquid at a temperature equal to or lower than the phase separation temperature to solidify the spinning solution.

However, a hollow fiber membrane produced by the non-solvent induced phase separation method does not have a bead structure that is exhibited when produced by a thermally induced phase separation method but has a three-dimensional network structure containing macrovoids, and therefore, the hollow fiber membrane has a disadvantage that the tensile strength is not sufficient. A hollow fiber membrane produced by the thermally induced phase separation method has a bead structure that does not include macrovoids and is symmetrical in the membrane thickness direction, and therefore, the hollow fiber membrane has a disadvantage that although the mechanical strength of the membrane is high, it is difficult to control the pore size, while the membrane has low separation characteristics.

Therefore, in order to commercialize hollow fiber membranes, physical and mechanical properties should be improved by improving tensile strength together with high moisture diffusion performance, and to this end, it is required to secure an optimal structure of the hollow fiber membranes.

DISCLOSURE OF INVENTION

Problem to be Solved by the Invention

An object of the present invention is to provide a hollow fiber membrane having excellent tensile strength and moisture diffusion characteristics.

Another object of the present invention is to provide a method for producing the above-described hollow fiber membrane.

Means for Solving Problem

An embodiment of the present invention provides a hollow fiber membrane including, sequentially from the center: a first layer having a high-density sponge structure including pores with a size of 1 nm or less; a second layer including a finger-shaped structure; and a third layer having a low-density sponge structure including pores with a size of 1,000 μm.

The thickness of the first layer may be 1 to 40 μm, the thickness of the second layer may be 20 to 60 μm, and the thickness of the third layer may be 20 to 50 μm.

The hollow fiber membrane may have a water vapor transmission rate 0.1 g/s/m² or greater as measured at a pressure of 1 bar and a temperature of 80° C.

The hollow fiber membrane may have a nitrogen transmission rate at a pressure of 0.7 bar of 100 cc/min/cm² or less.

The hollow fiber membrane may have an oxygen transmission rate at a pressure of 0.7 bar of 100 cc/min/cm² or less.

The hollow fiber membrane may have a tensile strength of 100 gf/fiber or greater.

The first layer to the third layer may each independently include one or more selected from the group consisting of polyethersulfone, polyphenylsulfone, polysulfone, polyvinylidene fluoride, polyimide, polyetherimide, polyamide, polyacrylonitrile, and cellulose acetate.

The hollow fiber membrane has an inner diameter of 600 to 1,400 μm and an outer diameter of 1,000 to 2,000 μm.

Another embodiment of the present invention provides a method for producing a hollow fiber membrane, the method including: a step of mixing a non-solvent, a poor solvent, and a polymer resin to produce a first spinning solution, and mixing a non-solvent, a good solvent, and a polymer resin to produce a second spinning solution; a step of spinning the first spinning solution by using a thermally induced phase separation method to produce a hollow first layer; a step of passing the spun support through a mixed solvent of a good solvent and a non-solvent; and a step of discharging the first layer and the second spinning solution through a spinneret to form a second layer and a third layer by a non-solvent induced phase separation method.

The first spinning solution may include 45% by weight to 70% by weight of the polymer resin, and the second spinning solution may include 15% by weight to 40% by weight of the polymer resin.

The polymer resin may include one or more selected from the group consisting of polyethersulfone, polyphenylsulfone, polysulfone, polyvinylidene fluoride, polyimide, polyetherimide, polyamide, polyacrylonitrile, and cellulose acetate.

The non-solvent may include one or more selected from the group consisting of water, methanol, ethanol, isopropanol, acetone, hexane, pentane, benzene, toluene, carbon tetrachloride, o-dichlorobenzene, and polyethylene glycol.

The good solvent may include one or more selected from the group consisting of N-methyl-2-pyrrolidone, dimethyl sulfoxide, dimethylacetamide, dimethylformamide, methyl ethyl ketone, tetrahydrofuran, tetramethylurea, and trimethyl phosphate.

The poor solvent may include one or more selected from the group consisting of butanol, isobutanol, octanol, pentanol, isopentanol, dimethyl phthalate, diethyl phthalate, dibutyl phthalate, dioctyl phthalate, and polyoxyethylene octyl phenyl ether.

The first spinning solution and the second spinning solution may each independently further include one or more hydrophilic additives selected from the group consisting of polyvinylpyrrolidone, polyethylene glycol, polyethylene oxide, glycerin, diethyl glycol, and triethylene glycol.

The first spinning solution and the second spinning solution may each independently further include one or more nonionic surfactant selected from the group consisting of a polyoxyethylene alkyl ether, a fatty sorbitan ester, and an alkyl monoglyceryl ether.

Effect of the Invention

Since the hollow fiber membrane according to the present invention includes all of a first layer as an inner support layer having a high-density sponge structure including pores with a size of 1 nm or less, a second layer as an intermediate layer including a finger-shaped structure, and a third layer as an outer layer having a low-density sponge structure including pores with a size of 10 to 1,000 μm, the hollow fiber membrane has excellent moisture diffusion characteristics. Furthermore, since the hollow fiber membrane according to the present invention includes both the first layer including a high-density sponge structure and the third layer including a low-density sponge structure on both sides of the second layer including a finger-shaped structure, there is an effect that tensile strength is further increased.

BRIEF DESCRIPTION OF DRAWINGS

FIG. 1 is a cross-sectional view of a hollow fiber membrane according to an embodiment of the present invention.

BEST MODE(S) FOR CARRYING OUT THE INVENTION

Hereinafter, embodiments of the present invention will be described in detail so that those ordinarily skilled in the art to which the present invention is pertained can easily carry out the invention. However, the present invention can be embodied in various different forms and is not intended to be limited to the embodiments described herein.

A hollow fiber membrane according to an aspect of the present invention will be described below.

The present invention relates to a hollow fiber membrane for humidification, which has excellent mechanical strength, a high degree of hydrophilicity, high moisture diffusibility, and a low gas transmission rate for nitrogen, oxygen, or the like.

The hollow fiber membrane (100) according to the aspect of the present invention includes, sequentially from the center: a first layer (10) having a high-density sponge structure including pores with a size of 1 nm or less; a second layer (20) including a finger-shaped structure; and a third layer (30) having a low-density sponge structure including pores with a size of 10 to 1,000 μm.

The inventors of the present invention could obtain a hollow fiber membrane having a three-layer structure as described above, by forming a first layer (10) as an inner support layer including a compact sponge structure by discharging a spinning solution including a high content of a polymer resin by using a thermally induced phase separation method, immersing this first layer (10) in a mixed solvent of a non-solvent and a good solvent, and then discharging this first layer together with a spinning solution by a non-solvent induced phase separation method.

The hollow fiber membrane (100) of the present invention can have the excellent mechanical strength required of a hollow fiber membrane as the first layer (10) as an inner support layer includes a high-density sponge structure, and can provide excellent water dispersion characteristics through the second layer (20) as an intermediate layer including a finger-shaped structure and a third layer (30) as an outer layer including a low-density sponge structure. Thus, the terms "high-density" and "low-density" of the high-density sponge structure of the first layer (10) and the low-density sponge structure of the third layer (30) can mean relative densities between the two layers, and the absolute values of these densities are not particularly limited and can be appropriately selected by those having ordinary skill in the art, as long as the first layer (10) can impart sufficient mechanical strength to the hollow fiber membrane, and the third layer (30) has excellent water dispersion characteristics for easy penetration and rapid transfer of water molecules.

Specifically, the first layer (10) of the hollow fiber membrane (100) is located most closely to the center of the hollow fiber membrane and has a high-density sponge structure including micropores with a size of 1 nm or less. Accordingly, the first layer (10) plays the role of an inner support layer of the hollow fiber membrane and can impart excellent mechanical strength. Here, the sponge structure can be understood as a three-dimensional network structure formed by a large number of pores connected to one another.

According to an embodiment, the first layer (10) can be formed to have a thickness of 1 μm to 40 μm in the hollow fiber membrane (100) of the present invention and preferably can be formed to have a thickness of 10 μm to 20 μm. When the thickness of the inner support layer is less than 1 μm, sufficient physical and mechanical characteristics cannot be imparted to the hollow fiber membrane so that the tensile strength of the hollow fiber membrane may be reduced, and when the thickness is more than 40 μm, it is difficult to control the pore size, and water dispersibility of the hollow fiber membrane may be excessively deteriorated.

Next, the second layer (20) as an intermediate layer including a finger-shaped structure provides macrovoids to the hollow fiber membrane (100) of the present invention and plays a role of reducing flow resistance of water molecules, increasing the permeation flow rate, and consequently imparting excellent water dispersion characteristics. The second layer (20) including the finger-shaped structure is located between the first layer (10) and the third layer (30) as an outer layer in the hollow fiber membrane (100) of the present invention. Here, the finger-shaped structure can be understood as an arrangement of vertical internal defects resembling the shape of a finger, and the finger-shaped structure means a structure in the form of a finger formed inside as the solvent and additives inside the spinning solution are rapidly discharged all at once due to a rapid rate of phase transition during the process of forming the hollow fiber membrane. Since the finger-shaped structure is formed at a rapid rate of phase transition, the second layer including the finger-shaped structure can also include a dense region together with the finger-shaped structure. According to an embodiment of the present invention, the second layer has advantages that due to such a finger-shaped structure, not only the flow resistance of water molecules is reduced and the permeation flux is increased, but also the nitrogen transmission rate or the oxygen transmission rate other than water vapor can be decreased due to the dense region.

According to an embodiment, the second layer (20) can be formed to have a thickness of 20 μm to 60 μm in the hollow fiber membrane (100) of the present invention, and preferably, the second layer (20) can be formed to have a thickness of 35 μm to 50 μm. When the thickness of the second layer (20) is less than 20 μm, macrovoids are not sufficiently secured in the hollow fiber membrane, and water dispersion characteristics may be r educed. When the thickness is more than 60 μm, there may be a problem that mechanical characteristics in the thickness direction of the hollow fiber membrane may be deteriorated.

The third layer (30), which is an outer layer formed next, is located on the outermost side of the hollow fiber membrane of the present invention and has a low-density sponge structure including fine pores with a size of 10 μm to 1,000 μm. Accordingly, water molecules can easily penetrate into loose areas outside the hollow fiber membrane, so that the third layer (30) plays a role of rapidly transferring water molecules to the second layer (20) including the above-described finger-shaped structure, which is in contact with the third layer (30).

According to an embodiment, the third layer (30) can be formed to have a thickness of 20 μm to 50 μm in the hollow fiber membrane (100) of the present invention, and preferably, the third layer (30) can be formed to have a thickness of 30 μm to 50 μm.

According to an embodiment, the hollow fiber membrane (100) may have a water vapor transmission rate of 0.1 $g/s/m^2$ or greater, and preferably 0.3 $g/s/m^2$ or greater, as measured at a pressure of 1 bar and a temperature of 80° C. The water vapor transmission rate is an index indicating the water vapor transmission performance. When the water vapor transmission rate is 0.1 $g/s/m^2$ or greater, a fuel cell stack can be subjected to optimal humidification, water vapor can be stably supplied, and the electrolyte membrane performance of the fuel cell stack can be sufficiently exhibited.

According to an embodiment, with regard to the hollow fiber membrane (100), the nitrogen transmission rate at a pressure of 0.7 bar may be 100 $cc/min/cm^2$ or less and may be, for example, 80 $cc/min/cm^2$ or less, for example, 50 $cc/min/cm^2$ or less, for example, 30 $cc/min/cm^2$ or less, and preferably 20 $cc/min/cm^2$ or less. This is because when the nitrogen transmission rate exceeds 100 $cc/min/cm^2$, the water vapor transmission performance of the hollow fiber membrane may be substantially deteriorated.

According to an embodiment, with regard to the hollow fiber membrane (100), the oxygen transmission rate at a pressure of 0.7 bar may be 100 $cc/min/cm^2$ or less and may be, for example, 80 $cc/min/cm^2$ or less, for example, 50 $cc/min/cm^2$ or less, for example, 30 $cc/min/cm^2$ or less, and preferably 20 $cc/min/cm^2$ or less. This is because when the oxygen transmission rate exceeds 100 $cc/min/cm^2$, the water vapor transmission performance of the hollow fiber membrane may be substantially deteriorated.

According to an embodiment, with regard to the hollow fiber membrane (100), the tensile strength may be 100 gf/fiber or greater and may be, for example, 200 gf/fiber or greater, for example, 250 gf/fiber or greater, and preferably 300 gf/fiber or greater. As the hollow fiber membrane (100) of the present invention includes a high-density sponge structure in the inner support layer of the hollow fiber membrane, the mechanical and physical characteristics are improved, and a tensile strength that satisfies the above-described range can be secured.

According to an embodiment, the first layer (10) to the third layer (30) can each independently include one or more selected from the group consisting of polyethersulfone, polyphenylsulfone, polysulfone, polyvinylidene fluoride, polyimide, polyetherimide, polyamide, polyacrylonitrile, and cellulose acetate, and for example, polyethersulfone, polyphenylsulfone, polysulfone, and polyvinylidene fluoride can be used. However, the materials are not limited to these as long as the materials are polymer resins that can be used for the hollow fiber membrane in order to achieve the intended effects of the present invention.

According to an embodiment, the inner diameter of the hollow fiber membrane (100) may be 600 to 1,400 μm, and the outer diameter may be 1,000 to 2,000 μm. When the inner diameter and the outer diameter of the hollow fiber membrane satisfy the above-described ranges, excellent moisture diffusion characteristics as a hollow fiber membrane for humidification can be secured.

According to another aspect of the present invention, there is provided a method for producing a hollow fiber membrane, the method including: a step (S1) of mixing a non-solvent, a poor solvent, and a polymer resin to produce a first spinning solution, and mixing a non-solvent, a good solvent, and a polymer resin to produce a second spinning solution; a step (S2) of spinning the first spinning solution by using a thermally induced phase separation method to produce a hollow first layer (10); a step (S3) of passing the spun support through a mixed solvent of a good solvent and a non-solvent; and a step (S4) of discharging the first layer (10) and the second spinning solution through a spinneret to form a second layer (20) and a third layer (30) by a non-solvent induced phase separation method.

First, the step (S1) is a step for preparing spinning solutions for producing the hollow fiber membrane of the present invention. Since the hollow fiber membrane (100) of the present invention is produced by sequentially using a thermally induced phase separation method and a non-solvent induced phase separation method in combination, a first spinning solution and a second spinning solution for each of the processes can be respectively used.

The first spinning solution includes a non-solvent, a poor solvent, and a polymer resin, and the second spinning solution includes a non-solvent, a good solvent, and a polymer resin.

First, a polymer resin is dissolved in a mixed solvent of a poor solvent and a non-solvent to produce a first spinning solution.

According to an embodiment, the polymer resin can include one or more selected from the group consisting of polyethersulfone, polyphenylsulfone, polysulfone, polyvinylidene fluoride, polyimide, polyetherimide, polyamide, polyacrylonitrile, and cellulose acetate, and for example, polyethersulfone, polyphenylsulfone, polysulfone, and polyvinylidene fluoride can be used. However, the polymer resin is not limited to these as long as it is a polymer resin that can be used for the hollow fiber membrane in order to achieve the intended effects of the present invention.

According to an embodiment, the first spinning solution can include 45% by weight to 70% by weight of the polymer resin and can include, for example, 50% by weight to 70% by weight, and preferably 60% by weight to 70% by weight, of the polymer resin. When the polymer resin content of the first spinning solution is less than 45% by weight, the mechanical strength of the hollow fiber membrane may be weak, and when the polymer resin content is more than 70% by weight, the viscosity of the first spinning solution becomes so high that spinning may be difficult. In addition, molding of the first layer (10), which is an inner layer having a small pore size, may be difficult, and there is a risk that the temperature of the poor solvent should be raised in order to dissolve a large amount of the polymer resin.

The poor solvent refers to a solvent that substantially does not dissolve the selected polymer resin at normal temperature (25° C.) and can dissolve the polymer resin only when heated to a high temperature, specifically 100° C. or higher, and in the present invention, the poor solvent can significantly dissolve the polymer resin at a temperature of 100° C. to 150° C.

According to an embodiment, the poor solvent is included in the first spinning solution and may include one or more selected from the group consisting of butanol, isobutanol, octanol, pentanol, isopentanol, dimethyl phthalate, diethyl phthalate, dibutyl phthalate, dioctyl phthalate, and polyoxyethylene octyl phenyl ether; however, the poor solvent is not necessarily limited to these. The poor solvent may be included at a proportion of 20% by weight to 50% by weight based on the total weight of the first spinning solution. When the content of the poor solvent is less than 20% by weight, the viscosity of the first spinning solution may become too high, making spinning difficult, and there is a risk that the temperature of the poor solvent should be raised in order to dissolve a large amount of the polymer resin. When the content is more than 50% by weight, the strength of the hollow fiber membrane may be excessively low.

The non-solvent refers to a solvent that cannot dissolve the selected polymer resin in all temperature ranges. According to an embodiment, the non-solvent is included in the first spinning solution and the second spinning solution and may include one or more selected from the group consisting of water, methanol, ethanol, isopropanol, acetone, hexane, pentane, benzene, toluene, carbon tetrachloride, o-dichlorobenzene, and polyethylene glycol; however, the non-solvent is not necessarily limited to these. The content of the non-solvent may be 1% by weight to 10% by weight based on the total weight of the first spinning solution. When the content of the non-solvent is less than 1% by weight, the strength of the hollow fiber membrane may be decreased, and when the content is more than 10% by weight, pore formation in the inner support layer of the hollow fiber membrane may not be easy.

Next, the polymer resin is dissolved in a mixed solvent of a good solvent and a non-solvent to produce a second spinning solution.

The second spinning solution can include 15% by weight to 40% by weight of the polymer resin and can include, for example, 20% by weight to 40% by weight, and preferably 20% by weight to 30% by weight, of the polymer resin. When the polymer resin content of the second spinning solution is less than 15% by weight, the porosity of the hollow fiber membrane may be too low, and when the polymer resin content is more than 40% by weight, the porosity of the first layer (10) as an inner active layer and the third layer (30) as an outer layer become too high, and there may be a problem that the overall mechanical strength of the hollow fiber membrane is decreased.

Specific examples of the polymer resin are as described above, and a polymer resin of the same type as the polymer resin included in the first spinning solution can be used, or polymer resins of mutually different types can be used.

According to an embodiment, the good solvent is included in the second spinning solution and may include one or more selected from the group consisting of N-methyl-2-pyrrolidone, dimethyl sulfoxide, dimethylacetamide, dimethylformamide, methyl ethyl ketone, tetrahydrofuran, tetramethylurea, and trimethyl phosphate; however, the good solvent is not necessarily limited to these. The good solvent may be included at a proportion of 30% by weight to 60% by weight based on the total weight of the second spinning solution. When the content of the good solvent is less than 30% by weight, the viscosity of the second spinning solution becomes too high, making spinning difficult, and there is a risk that the temperature of the good solvent should be increased in order to smoothly dissolve the polymer resin. When the content is more than 60% by weight, the viscosity of the second spinning solution may become too low, and spinnability may be deteriorated.

Specific examples of the non-solvent are as described above, and a non-solvent of the same type as the non-solvent included in the first spinning solution can be used, or non-solvents of mutually different types can be used.

According to an embodiment, the first spinning solution and the second spinning solution can each independently further include a hydrophilic additive that plays a role of assisting in pore formation in the hollow fiber membrane, and for example, the spinning solutions can further include one or more hydrophilic additives selected from the group consisting of polyvinylpyrrolidone, polyethylene glycol, polyethylene oxide, glycerin, diethyl glycol, and triethylene glycol.

The hydrophilic additive may be included at a proportion of 5% by weight to 25% by weight based on the total weight of each spinning solution. When the content of the additive is less than 5% by weight, pore formation in the hollow fiber membrane may not be smoothly achieved, and when the content is more than 25% by weight, phase separation of the spinning solution may proceed rapidly, resulting in fiber breakage in the spinning process.

According to an embodiment, the first spinning solution and the second spinning solution may each independently further include one or more nonionic surfactant selected from the group consisting of a polyoxyethylene alkyl ether, a fatty sorbitan ester, and an alkyl monoglyceryl ether.

There is no particular production sequence in the processes of the production of the first spinning solution and the production of the second spinning solution.

Next, the step (S2) is a step of forming a first layer (10) as an inner support layer including a high-density sponge structure using the first spinning solution by a thermally induced phase separation method.

Specifically, in the step (S2), the first layer (10) as an inner support layer can be formed by discharging a first spinning solution obtained by mixing a non-solvent, a poor solvent, and a polymer resin through a spinneret at a spinning temperature of 100° C. to 300° C. As the first layer (10) is formed by using the first spinning solution including a polymer resin at a high content by a thermally induced phase separation method, a hollow fiber membrane having excellent mechanical strength while having favorable moisture diffusion properties can be formed.

The discharge rate for the first spinning solution can be regulated to about 10 to g/min.

During the process of discharging the first spinning solution through, for example, a spinneret composed of a double tube, a mixed liquid can be discharged into the hollow cavity of the spun product, and at this time, the mixed liquid may include a good solvent and a non-solvent. Specific examples of the good solvent and the non-solvent are as described above. By discharging the mixed liquid into the hollow cavity of the spun product in this way, a hollow fiber membrane form can be obtained more easily.

The spun product discharged through the spinneret can be solidified by passing through an air gap and being brought into contact with the mixed solvent of the step (S3) that will be described below. The air gap is mainly an air layer or an inert gas layer, and in this case, the length of the air gap can be maintained at 0.1 to 15 cm. The first layer (10) that is formed through the step (S2) serves as an inner support layer in the hollow fiber membrane (100) of the present invention, and the hollow fiber membrane produced through the step (S2) may have an inner diameter of about 600 to 1,400 μm and an outer diameter of 1,000 to 2,000 μm.

Next, the support spun in the step (S2) is solidified (S3) while being brought into contact with a mixed solvent of a good solvent and a non-solvent.

The mixed solvent may be, for example, in a state of being cooled to 5° C. to 25° C. and plays a role of solidifying the support spun in the step (S2). Specific examples of the good solvent and the non-solvent included in the mixed solvent are as described above.

Next, the step (S4) is a step of discharging the first layer (10) solidified in the step (S3) and the second spinning solution through a spinneret and forming a second layer (20)

as an intermediate layer and a third layer (30) as an outer layer of the hollow fiber membrane by a non-solvent induced phase separation method.

The spinneret may be, for example, a double tube composed of two tubes. Therefore, when the first layer (10) formed through the step (S3) and the second spinning solution are each separately supplied to the spinneret composed of a double tube, and particularly when the first layer (10) is supplied to the inner part of the spinneret while the second spinning solution is supplied to the outer part of the spinneret, the inner surface of the obtained spun product may be formed from the first layer (10), and the outer surface may be formed from the spun product of the second spinning solution.

The spun product discharged through the spinneret can be solidified by passing through an air gap. The air gap is mainly an air layer or an inert gas layer, and in this case, the length of the air gap can be maintained at 1 to 50 cm.

In the step (S4), when the mixed solvent of a non-solvent and a good solvent deposited on the outside of the first layer (10) in the step (S3) and the second spinning solution are brought into contact with each other in the spinning process, rapid phase transition occurs, and as a result, a second layer (20) as an intermediate layer having a finger-shaped structure is rapidly formed on the outer surface of the support layer. At this time, the mixed solvent serves as a bore liquid in the process of spinning a hollow fiber membrane, and at the moment that the mixed solvent is discharged through the nozzle of the spinneret composed of a double tube, the solvent included in the second spinning solution and the non-solvent included in the above-described mixed solvent are instantaneously exchanged in the process of bringing the mixed solvent into contact with the second spinning solution, which results in the formation of an intermediate layer having a finger-shaped structure through a process of solidifying. Thereafter, during the process that the second spinning solution discharged through the nozzle of the spinneret passes through the air gap, the non-solvent and the second spinning solution react with each other on the outside of the second layer (20) having the finger-shaped structure through a process of contacting, resulting in phase transition. As a result, the third layer (30), which is an outer layer having a low-density sponge structure, can be formed.

In the step (S4), specific examples of the non-solvent and the good solvent of the second spinning solution are as described above.

EXAMPLES

Hereinafter, the present invention will be specifically described by way of Examples and Comparative Examples. However, the following Examples are intended only for facilitating understanding of the present invention, and the scope of rights of the present invention is not limited thereby.

Example

65% by weight of polyphenylsulfone (PPSu), 20% by weight of isobutanol, 10% by weight of polyethylene glycol (PEG 200), and 5% by weight of Triton X-10 as a nonionic surfactant were mixed, and the mixture was stirred at 150° C. for 24 hours to produce a first spinning solution.

28% by weight of polyphenylsulfone, 25% by weight of polyethylene glycol (PEG 200), 45.5% by weight of a solvent, and 1.5% by weight of Triton X-10 as a nonionic surfactant were mixed, and the mixture was stirred at 150° C. for 24 hours to produce a second spinning solution.

The first spinning solution produced as described above was discharged through a spinneret composed of a double tube to obtain a spun product. At this time, a mixed liquid at 25° C. consisting of 80% by weight of dimethylacetamide (DMAc) and 20% by weight of polyethylene glycol (PEG) was supplied to and discharged through the inner part of the spinneret composed of a double tube, and the first spinning solution was supplied to and discharged through the outer part of the spinneret composed of a double tube.

The spun product was passed through an air gap having a length of 5 cm and then was immersed in a solidifying liquid in a solidification bath. For the solidifying liquid, a mixed solvent of N-methyl-2-pyrrolidone and water at 25° C. was used.

The hollow fiber membrane obtained after being solidified in the solidification bath was discharged again continuously through a spinneret composed of a double tube.

At this time, the hollow fiber membrane thus formed was supplied to and discharged through the first spinning solution of the spinneret composed of a double tube, and the second spinning solution was supplied to and discharged through the outer part of the spinneret composed of a double tube.

Thereafter, the discharged product was washed with pure water at 25° C., subjected to a hydrothermal treatment using a post-treatment liquid at 80° C. including water and glycerin, and then dried to obtain a hollow fiber membrane.

Comparative Example

65% by weight of polyphenylsulfone (PPSu), 20% by weight of isobutanol, 10% by weight of polyethylene glycol (PEG 200), and 5% by weight of Triton X-10 as a nonionic surfactant were mixed, and the mixture was stirred at 150° C. for 24 hours to produce a first spinning solution.

The spinning solution thus produced was discharged through a spinneret composed of a double tube to obtain a spun product. During the process of discharging the spinning solution, a mixed liquid at 25° C. consisting of 80% by weight of dimethylacetamide (DMAc) and 20% by weight of polyethylene glycol (PEG) was discharged through the inside of the hollow cavity of the spun product.

The spun product was passed through an air gap having a length of 30 cm and then was immersed in a solidifying liquid in a solidification bath. Water at 50° C. was used as the solidifying liquid.

The spun product obtained by being solidified in the solidification bath was washed with pure water at 50° C., subjected to a hydrothermal treatment using a post-treatment liquid at 80° C. including water and glycerin, and then dried to obtain a hollow fiber membrane.

Evaluation Example 1: Measurement of Water Vapor Transmission Rate

A stainless steel pipe module was produced by passing seventeen hollow fiber membranes obtained by the Example or the Comparative Example through a stainless steel pipe having a diameter of 10 mm and fixing both ends of the pipe with an adhesive. Under the temperature conditions at 80° C., a dry gas was caused to flow through the inner part of the hollow fiber membranes from the gas inlet port toward the gas outlet port of the stainless steel pipe module. The gas coming out from the gas outlet port was humidified with a humidifier, and the humidified wet gas was caused to flow through the outer part of the hollow fiber membrane. In this manner, the gas was caused to flow in single-pass crossflow. The linear velocity inside the hollow fiber membrane was set to 1,000 cm/s by using an air flow meter. The temperature and humidity of the gas at the dry gas inlet port and the dry gas outlet port at this time were measured. The amount of water vapor transmission was determined from these values, and a value obtained by dividing this water vapor transmission rate by the time for flowing the drying gas, the effective area of the hollow fiber membranes, and the air input pressure of the dry gas was designated as water vapor transmission rate. The results are shown in the following Table 1. Here, the effective area of the hollow fiber membrane is the area determined by (inner diameter of the hollow fiber membrane×the ratio of the circumference of a circle to its diameter×length of the hollow fiber membranes) in a case where the dry gas is caused to flow through the inner part of the hollow fiber membrane.

Evaluation Example 2: Measurement of Nitrogen Transmission Rate

A pressure regulator was installed in a cylinder containing nitrogen gas, and a stainless steel pipe was connected to the cylinder so that nitrogen gas could flow therethrough. Gas flow meters were installed at the front end and the rear end of the pipe, and a tube containing the hollow fiber membrane obtained by the Example or the Comparative Example was mounted. The hollow fiber membrane was located inside a tube having a diameter of 10 mm by using an adhesive so that nitrogen gas could flow through the inner part of the hollow fiber membrane. One end of the hollow fiber membrane was blocked so that nitrogen gas could flow from the inside to the outside, subsequently a pressure of 0.7 bar was maintained, and the flow rate values at the front end and the rear end of the pipe were measured. The nitrogen transmission rate is a value determined by dividing the average value of the flow rate measured as described above, by the membrane area of the hollow fiber membrane. The results are as shown in the following Table 1.

Evaluation Example 3: Measurement of Tensile Strength

A hollow fiber membrane sample (membrane length 100 mm) obtained according to the Example or the Comparative Example was prepared, subsequently Instron 4304 was used to fix the membrane specimen to the upper and lower Action Grips using a 1 N cell load, and then tensile strength was measured by a method of pulling at a crosshead speed of 50.0 mm/min. The results are as shown in the following Table 1.

TABLE 1

|  | Example | Comparative Example |
|---|---|---|
| Water vapor transmission rate (g/s/m$^2$) | 0.5 | 0.7 |
| Nitrogen transmission rate (cc/min/cm$^2$) | 15 | 200 |
| Tensile strength (gf/fiber) | 500 | 270 |

The hollow fiber membrane of the Comparative Example has a structure composed only of a sponge layer without the second layer having a finger-shaped structure, and therefore, the membrane thickness is relatively thin so that the hollow fiber membrane of the Comparative Example has lower tensile strength compared with the hollow fiber membrane of the Example. Furthermore, while the second layer having a finger-shaped structure is formed, a dense region is also produced due to rapid phase transition as described above. However, in the Comparative Example, since there is no second layer having a finger-shaped structure, which includes such a dense region, the nitrogen transmission rate rapidly increased.

Specific embodiments of the present invention have been described and illustrated above; however, the present invention is not intended to be limited to the described embodiments, and it is obvious to those ordinarily skilled in the art to which the invention is pertained that various modifications and variations can be made without departing from the spirit and scope of the present invention. Therefore, such modification examples and variation examples should not be understood separately from the technical idea or viewpoint of the present invention, and the modified embodiments should be understood to be within the scope of the claims of the present invention.

The invention claimed is:

1. A hollow fiber membrane comprising, sequentially from the center:

a first layer having a high-density sponge structure including pores with a size of 1 nm or less;

a second layer including a finger-shaped structure; and a third layer having a low-density sponge structure including pores with a size of 10 to 1,000 μm.

2. The hollow fiber membrane according to claim 1, wherein the first layer has a thickness of 1 to 40 μm, the second layer has a thickness of 20 to 60 μm, and the third layer has a thickness of 20 to 50 μm.

3. The hollow fiber membrane according to claim 1, wherein the hollow fiber membrane has a water vapor transmission rate of 0.1 $g/s/m^2$ or greater as measured at a pressure of 1 bar and a temperature of 80° C.

4. The hollow fiber membrane according to claim 1, wherein the hollow fiber membrane has a nitrogen transmission rate at a pressure of 0.7 bar of 100 $cc/min/cm^2$ or less.

5. The hollow fiber membrane according to claim 1, wherein the hollow fiber membrane has an oxygen transmission rate at a pressure of 0.7 bar 100 $cc/min/cm^2$ or less.

6. The hollow fiber membrane according to claim 1, wherein the hollow fiber membrane has a tensile strength of 100 gf/fiber or greater.

7. The hollow fiber membrane according to claim 1, wherein the first layer to the third layer each independently include one or more selected from the group consisting of polyethersulfone, polyphenylsulfone, polysulfone, polyvinylidene fluoride, polyimide, polyetherimide, polyamide, polyacrylonitrile, and cellulose acetate.

8. The hollow fiber membrane according to claim 1, wherein the hollow fiber membrane has an inner diameter of 600 to 1,400 μm and an outer diameter of 1,000 to 2,000 μm.

* * * * *